United States Patent
Bowman et al.

(10) Patent No.: US 6,345,868 B1
(45) Date of Patent: Feb. 12, 2002

(54) FLUID COUPLING FOR DUAL WHEELS

(75) Inventors: Larry W. Bowman, Troy; Raji S. El-Kassouf, Sterling Heights; Richard M. Clisch, Canton; Patrick D. Laper, Rochester; Michael G. Semke, Novi; Gary P. Ford, Rochester, all of MI (US); Joseph B. Saxon, Cookeville, TN (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/501,839

(22) Filed: Feb. 10, 2000

(51) Int. Cl.[7] .................. B60B 11/00; B60B 19/00; B60K 17/14; B60K 7/00
(52) U.S. Cl. ................ 301/36.2; 301/6.5; 301/36.1; 180/308
(58) Field of Search .................. 301/6.1, 6.5, 36.1, 301/36.2, 36.3; 180/308; 295/37, 44; 74/730.1

(56) References Cited

U.S. PATENT DOCUMENTS

| | | | | | |
|---|---|---|---|---|---|
| 1,544,297 A | * | 6/1925 | Einfeldt | ............... | 301/36.1 |
| 1,565,393 A | * | 12/1925 | Prentiss | ............... | 301/36.1 |
| 1,809,699 A | * | 6/1931 | Higbee | ............... | 301/36.1 |
| 2,298,333 A | * | 10/1942 | Ash et al. | ............... | 301/6.1 |
| 2,401,488 A | * | 6/1946 | Lewis | ............... | 301/36.2 |
| 2,536,119 A | * | 1/1951 | Ash | ............... | 301/36.2 |
| 2,569,861 A | * | 10/1951 | Moore et al. | ............... | 301/36.2 |
| 2,727,582 A | * | 12/1955 | Lisenby | ............... | 301/36.2 |
| 3,154,315 A | * | 10/1964 | Ash | ............... | 301/36.2 |
| 3,422,917 A | * | 1/1969 | Guinot | ............... | 180/308 |
| 4,244,184 A | * | 1/1981 | Baldauf et al. | ............... | 180/308 |
| 4,249,783 A | * | 2/1981 | Glassmeyer | ............... | 308/187 |
| 5,967,273 A | * | 10/1999 | Hampton | ............... | 192/21.5 |
| 6,109,385 A | * | 8/2000 | Deininger et al. | ............... | 180/308 |
| 6,148,941 A | * | 11/2000 | Hinton et al. | ............... | 301/6.5 |

* cited by examiner

*Primary Examiner*—S. Joseph Morano
*Assistant Examiner*—Jason R. Bellinger
(74) *Attorney, Agent, or Firm*—Carlson, Gaskey & Olds

(57) ABSTRACT

A dual wheel axle assembly for a vehicle is provided for reducing tire wear caused by scrubbing during vehicle turns. The assembly includes an axle housing having an axle shaft arranged within the axle housing. The axle shaft defines a rotational axis. A first wheel hub is supported on an end portion of the axle housing and is mechanically coupled to the axle shaft. A second wheel hub is supported on the end portion adjacent to the first wheel hub. A fluid coupling is interconnected between the axle shaft and the second wheel hub. The fluid coupling has fluid for fluidly driving the second wheel hub through the axle shaft and permitting the second wheel hub to rotate about the rotational axis relative to the first wheel hub during the vehicle turn.

9 Claims, 2 Drawing Sheets

FLUID COUPLING FOR DUAL WHEELS

BACKGROUND OF THE INVENTION

This invention relates to an axle assembly having multiple wheels at each end of an axle housing, and more specifically, the invention relates to dual wheel assemblies in which one wheel is permitted to rotate relative to the other wheel.

Axle assemblies having dual wheels on either end of the axle have been used to increase the load bearing capability of heavy duty vehicles. Typically the pair of wheels on each end of the axle assembly are secured together so that they rotate together about an axis. Some heavy duty vehicles, such as lift trucks, undergo numerous turning maneuvers which wear the tires significantly. The tire wear is caused when the tires scrub, or drag, since the wheels that are secured together must travel different distances at the inside and outside of the turning radius. Tire wear and maintenance on heavy duty lift trucks due to scrub cost thousands of dollars annually per vehicle.

Dual wheel assembly designs have been proposed that permit the wheels to rotate relative to one another to reduce scrubbing during vehicle turns. One wheel assembly has provided a pair of wheels on an end portion of an axle housing that is fluidly driven by the axle shaft. The axle shaft drives an impeller that fluidly drives a turbine connected to each wheel hub. While the wheel assembly permits slip between the wheels during vehicle turns, there is not a mechanically driven wheel to ensure traction by one wheel. Furthermore, by not providing at least one mechanically drive wheel, the overall efficiency of the dual wheel assembly is reduced. Therefore what is needed is a dual wheel assembly having a fluid coupling with a mechanically driven wheel that permits slip during vehicle turns.

SUMMARY OF THE INVENTION AND ADVANTAGES

The present invention provides a dual wheel axle assembly for a vehicle. The assembly includes an axle housing having an axle shaft arranged within the axle housing.

The axle shaft defines a rotational axis. A first wheel hub is supported on an end portion of the axle housing and is mechanically coupled to the axle shaft. A second wheel hub is supported on the end portion adjacent to the first wheel hub. A fluid coupling is interconnected between the axle shaft and the second wheel hub. The fluid coupling has fluid for fluidly driving the second wheel hub through the axle shaft and permitting the second wheel hub to rotate about the rotational axis relative to the first wheel hub during a vehicle turn.

Accordingly, the above invention provides a dual wheel assembly having a fluid coupling with a mechanically driven wheel that permits slip during vehicle turns.

BRIEF DESCRIPTION OF THE DRAWING

Other advantages of the present invention can be understood by reference to the following detailed description when considered in connection with the accompanying drawings wherein.

DETAILED DESCRIPTION OF THE PREFERRED EMBODIMENT

Figure 1:
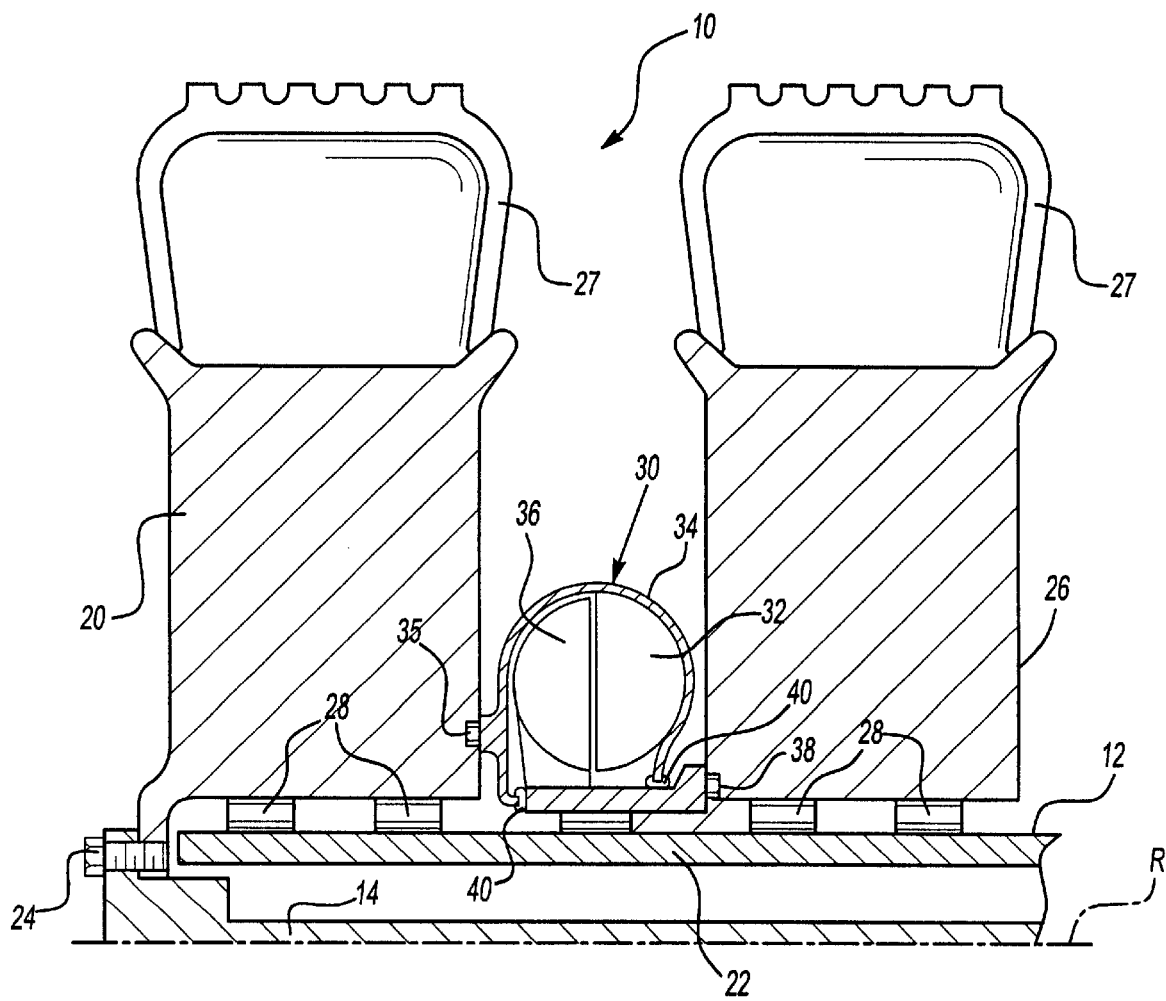
FIG. 1 is a cross-sectional view of the present invention dual wheel assembly fluid coupling utilizing hydraulic fluid.
Figure 2:
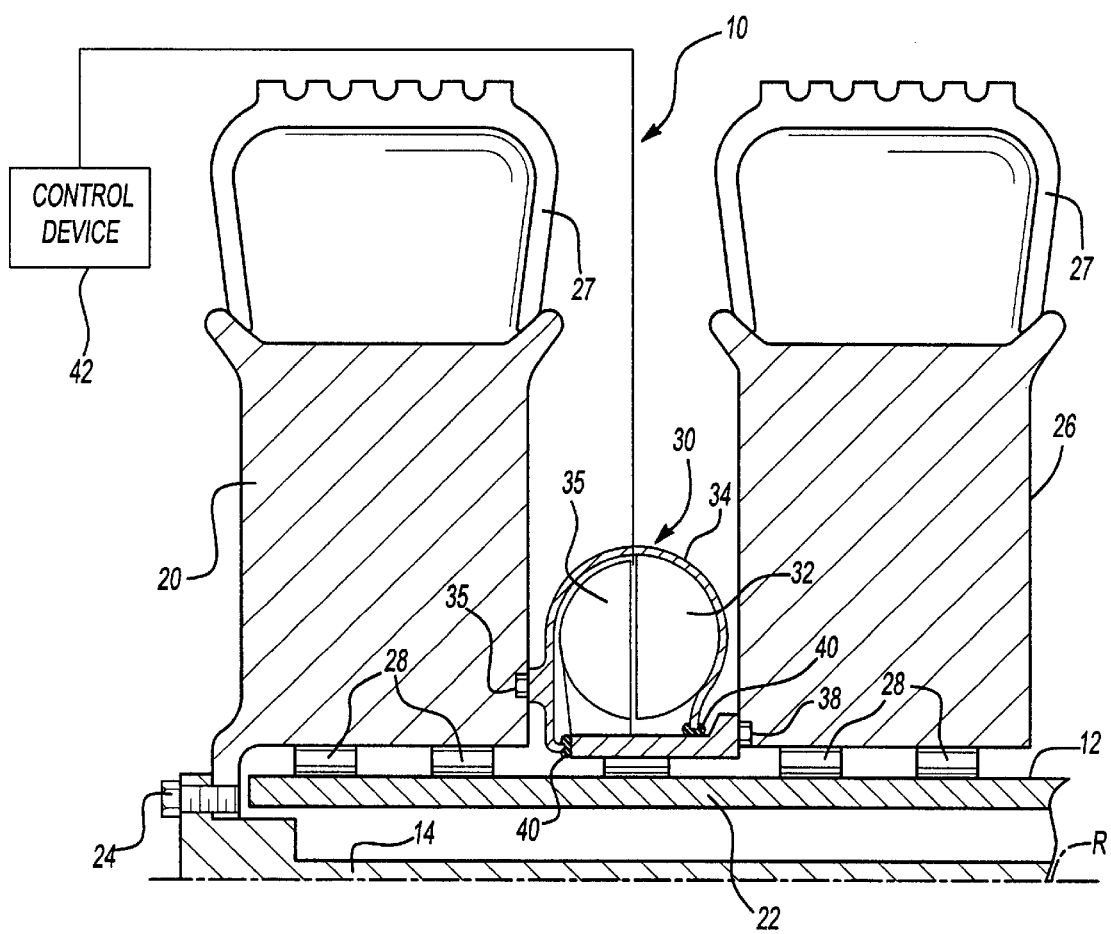
FIG. 2 is a cross-sectional of another embodiment of the present invention dual wheel assembly fluid coupling shown in FIG. 1 utilizing Theological fluid.

A dual wheel axle assembly 10 for a vehicle is shown in FIGS. 1 and 2. The assembly 10 includes an axle housing 12 having an axle shaft 14 arranged within the axle housing 12. The axle shaft 14 defines a rotational axis R. A first wheel hub 20 is supported on an end portion 22, or spindle, of the axle housing 12. The first wheel hub 20 is mechanically coupled to the axle shaft 14 by a plurality of fasteners 24. However, it is to be understood that the present invention may incorporate a gear reduction device, such as a planetary gear set, between the axle shaft 14 and the first wheel hub 20. A second wheel hub 26 is supported on the end portion 22 adjacent to the first wheel hub 20.

Bearings 28 support the first 20 and second 26 wheel hubs on the axle housing 12. The wheel hubs 20, 26 are shown supported independently on the axle housing 12, that is, a portion of either wheel hub is not supported on a portion of the other wheel hub. Obviously, the wheel hubs 20, 26 may be supported in a manner that is different from the configuration shown. Inflatable rubber tires 27 are supported on the wheel hubs 20, 26, although any suitable type of tire may be used. The axle assembly 10 may also include another set of wheel hubs on an end opposite the end portion 22, which is not shown in the Figure.

A fluid coupling 30 interconnects the axle shaft 14 and the second wheel hub 26. If a gear reduction device is used between the axle shaft 14 and the first wheel hub 20, the fluid coupling 30 would interconnect the second wheel hub 20 to the axle shaft 14 through the reduction device. Preferably, the fluid coupling 30 is arranged between the wheel hubs 20, 26 with a portion mechanically coupled to each of the wheel hubs 20, 26, discussed in more detail below. The fluid coupling 30 contains a fluid, such as hydraulic fluid (shown in FIG. 1), for fluidly driving the second wheel hub 26 via the axle shaft 14 and permitting the second wheel hub 26 to rotate about the rotational axis R relative to the first wheel hub 20 during a vehicle turn. Fluid couplings are typically not 100% efficient, and therefore permit a limited amount of slip. The fluid coupling 30 is sufficiently efficient such that it applies a rotational force to the second wheel hub 26 that is approximately the same as the first wheel hub 20 so that the wheel hubs normally rotate at the same speed. During vehicle turns, which normally causes significant tire wear due to scrubbing, the fluid coupling 30 permits the second wheel hub to turn at a slower or faster rate, or slip, relative to the first wheel hub. In this manner, tire wear is reduced with the present invention.

Preferably, the first wheel hub 20 is an outer wheel and the second wheel hub 26 is an inner wheel. The first wheel hub 20 is rotationally driven through the mechanical coupling to the axle shaft 14 to ensure that one wheel hub is provided with the maximum traction force available. For example, the axle shaft 14 will transmit traction force to the first wheel hub 20 if the vehicle travels over an uneven surface and the second wheel hub 26 were to leave the surface, such as when the first wheel hub 20 drives over a curb. Furthermore, if both wheel hubs 20, 26 became stuck or if the fluid coupling 30 lost fluid, the axle shaft 14 will continue to drive the first wheel hub 20.

The fluid coupling 30 includes an impeller 32 integrally disposed within a fluid coupling housing 34. The housing 34 and impeller 32 are secured to the first wheel hub 20 in any suitable manner, such as by using threaded fasteners 35. A turbine 36 is arranged within the housing 34 adjacent to the impeller 32 and is secured to the second wheel hub 26 in any suitable manner, such as by using threaded fasteners 38. Seals 40 retain the fluid within the housing 34. The impeller 32 applies a fluid force to the turbine 36, as is well known, for fluidly driving the second wheel hub 26 as the first wheel hub 20 rotates about rotational axis R. Slip is permitted due to losses when applying the fluid force from the impeller 32 to the turbine 36.

To provide improved control of the slip between the first 20 and second 26 wheel hubs, rheological fluid may be used instead of hydraulic fluid, as shown in FIG. 2. Rheological fluid has a viscosity that may be varied by applying electrical power from a control device 42. The slip may be operator controlled, or controlled automatically, for example, a sensor may provide an input to the control device 42 indicating the steering angle. The control device 42 calculates the desired slip and applies a voltage to the Theological fluid to obtain the desired viscosity. Alternatively, the second wheel hub 26 may normally free-wheel and be selectively activated for increased traction when needed by increasing the viscosity of the rheological fluid. In this manner, the viscosity may be selectively controlled by the control device 42 for controlling relative rotation between the first 20 and second 26 wheel hubs about the rotational axis R.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A dual wheel axle assembly for a vehicle, said assembly comprising:

an axle housing having an axle shaft disposed therein defining a rotational axis;

a first wheel hub supported on an end portion of said axle housing, said first wheel hub mechanically coupled to said axle shaft;

a second wheel hub supported on said end portion adjacent said first wheel hub;

a fluid coupling interconnected between said axle shaft and said second wheel hub, said fluid coupling having fluid for fluidly driving said second wheel hub through said axle shaft and permitting said second wheel hub to rotate about said rotational axis relative to said first wheel hub during a vehicle turn.

2. The assembly as set forth in claim 1 wherein said fluid coupling is mechanically coupled to said first and second wheel hubs.

3. The assembly as set forth in claim 2 wherein said fluid coupling includes an impeller secured to said first wheel hub and a turbine adjacent to said impeller and secured to said second wheel hub, said impeller applying a fluid force to said turbine for fluidly driving said second wheel hub.

4. The assembly as set forth in claim 3 wherein said impeller is integrally disposed within a fluid coupling housing.

5. The assembly as set forth in claim 3 wherein said fluid comprises hydraulic fluid.

6. The assembly as set forth in claim 3 wherein said fluid comprises rheological fluid having a viscosity, and said assembly further comprises a control device for applying an electrical power to said rheological fluid for changing said viscosity for controlling relative rotation between said first and second wheel hubs about said rotational axis.

7. The assembly as set forth in claim 2 wherein said fluid coupling is interposed between said first and second wheel hubs.

8. The assembly as set forth in claim 1 wherein said first and second wheel hubs are each independently supported on said end portion.

9. The assembly as set forth in claim 1 wherein said first wheel hub is an outer wheel and said second wheel hub is an inner wheel.

* * * * *